US010572302B2

(12) United States Patent
Holder

(10) Patent No.: US 10,572,302 B2
(45) Date of Patent: Feb. 25, 2020

(54) COMPUTERIZED METHODS AND SYSTEMS FOR EXECUTING AND ANALYZING PROCESSES

(71) Applicant: ORACLE INTERNATIONAL CORPORATION, Redwood Shores, CA (US)

(72) Inventor: John David Holder, Centennial, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 90 days.

(21) Appl. No.: 15/805,189

(22) Filed: Nov. 7, 2017

(65) Prior Publication Data

US 2019/0138348 A1   May 9, 2019

(51) Int. Cl.
*G06F 9/46* (2006.01)
*G06F 9/48* (2006.01)
*G06F 9/455* (2018.01)

(52) U.S. Cl.
CPC ........ *G06F 9/4843* (2013.01); *G06F 9/45533* (2013.01); *G06F 2009/45587* (2013.01)

(58) Field of Classification Search
CPC ............. G06F 11/3624; G06F 11/3612; G06F 11/3495; G06F 11/368; G06F 9/30; G06F 21/577; G06F 8/34; G06F 9/4843; G06F 9/45533; G06F 2009/45587; H04L 47/827; G06Q 10/04
See application file for complete search history.

(56) References Cited

U.S. PATENT DOCUMENTS

| | | | | |
|---|---|---|---|---|
| 5,590,329 A  * | 12/1996 | Goodnow, II | ...... | G06F 11/3624 714/E11.211 |
| 2007/0011334 A1* | 1/2007 | Higgins | .................... | G06F 8/34 709/227 |
| 2011/0258603 A1* | 10/2011 | Wisnovsky | ......... | G06F 11/3612 717/125 |
| 2012/0131309 A1* | 5/2012 | Johnson | .................... | G06F 9/30 712/41 |
| 2013/0060933 A1* | 3/2013 | Tung | .................... | G06F 11/3495 709/224 |
| 2013/0152047 A1* | 6/2013 | Moorthi | ................ | G06F 11/368 717/124 |

(Continued)

*Primary Examiner* — Tuan A Vu
(74) *Attorney, Agent, or Firm* — Kraguljac Law Group, LLC

(57) ABSTRACT

Systems, methods, and other embodiments associated with executing and analyzing processes are described. In one embodiment, a method includes providing access to a process execution architecture for executing available processes. The example method may also include evaluating configuration data to determine that an analysis is to be performed upon a first process for a user in response to the user accessing and logging into the process execution architecture. The example method may also include initiating an analysis session and executing the first process within the analysis session for the user while providing separate accessibility to other users to concurrently executing the first process. The example method may also include executing an analysis tool through the analysis session for analyzing execution of the first process. The example method may also include providing results of the analysis.

19 Claims, 9 Drawing Sheets

(56) References Cited

U.S. PATENT DOCUMENTS

2016/0094483 A1\* 3/2016 Johnston ............... H04L 47/827
                                                      709/226
2018/0060738 A1\* 3/2018 Achin .................... G06Q 10/04
2018/0349614 A1\* 12/2018 Ionescu ................ G06F 21/577

\* cited by examiner

COMPUTERIZED METHODS AND SYSTEMS FOR EXECUTING AND ANALYZING PROCESSES

BACKGROUND

Enterprise software platforms are complex due to having many layers of architecture to make them work. An enterprise software platform can support concurrent access by multiple users such as to execute various processes. For example, the enterprise software platform can execute processes to implement various business functionality, such as process and workflow tracking functionality, website creation and hosting functionality, application creation and execution functionality, account functionality, inventory tracking functionality, etc.

Because many processes are shared by users, debugging issues for a particular user and process can be difficult. In particular, the entire enterprise software platform may have to be brought into a one-user mode in order to attach analysis and debugging processes, thus no other user can have access to the enterprise software platform. Otherwise, analysis of low level critical issues could not be performed without impacting other users due to the shared aspect of process execution by the enterprise software platform. Thus, a business must arrange for a time during which the entire enterprise software platform will be unavailable to other users because the issue may only arise within a real-time production environment of the enterprise software platform. This is because the Issue may be unable to be duplicated outside the real-time production environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for executing and analyzing processes. A process execution architecture is configured to execute processes that are requested by users. A user may experience an issue with a process that cannot be duplicated outside a production environment of the process execution architecture, such as where the issue arises due to certain data being generated within the production environment. Bringing the process execution architecture into a one-user mode for debugging, such as in conventional systems, is disruptive to other users because such users would not be able to access the enterprise software platform.

As will be described herein, in one embodiment, a process identified for debugging is isolated within an analysis session without disrupting access to the enterprise software platform by other users for executing the same process. Thus other users can still access the enterprise software platform during debugging, such as to execute other instances of the process being debugged. An analysis tool is executed through the analysis session for analyzing execution of the process without interrupting execution of processes by the process execution architecture for other users, such as the other instances of the process being analyzed. In this way, the process can be analyzed within the production environment of the process execution architecture while other users are utilizing the process execution architecture.

Figure 1:
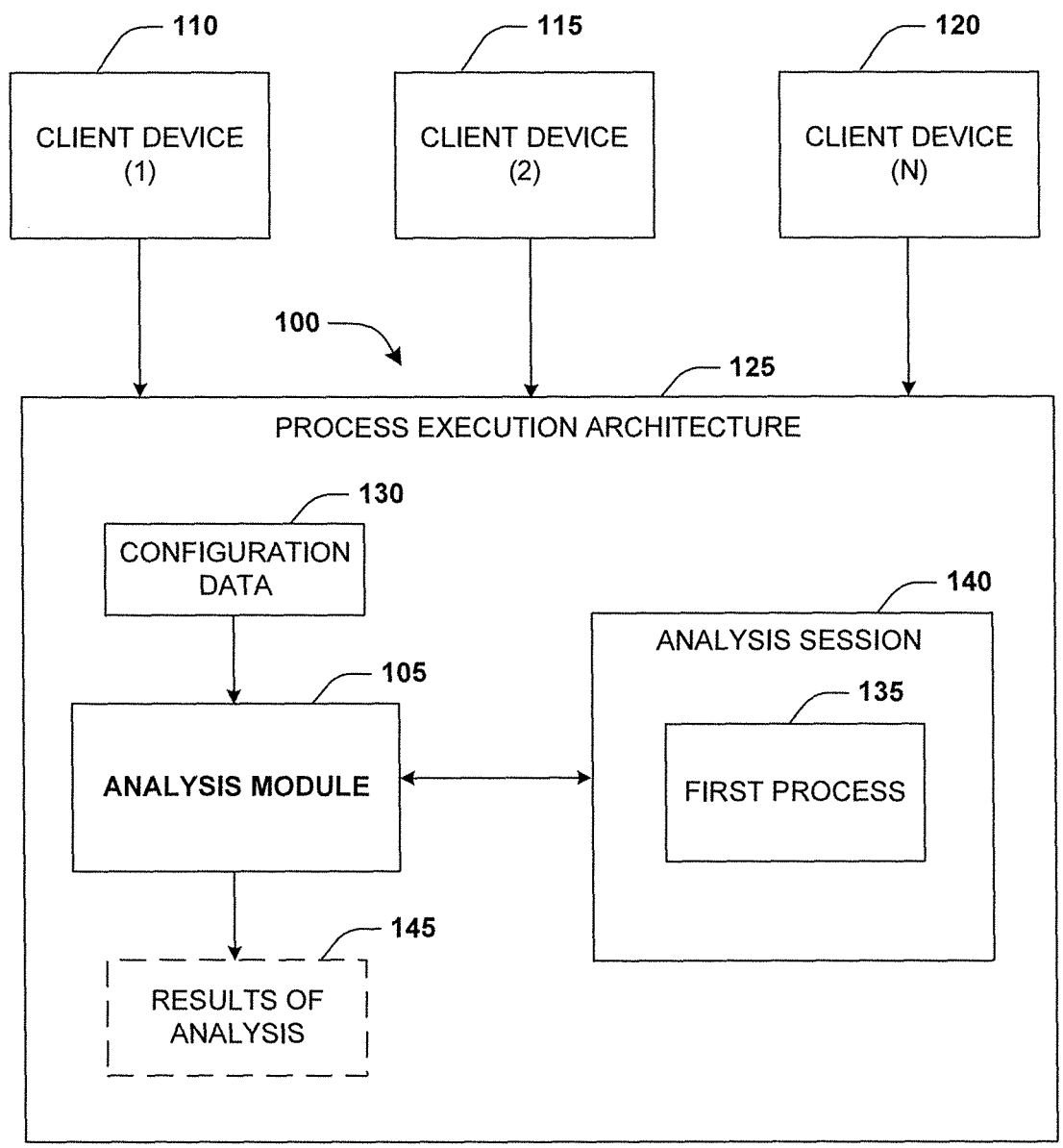
FIG. 1 illustrates an embodiment of a system associated with executing and analyzing processes.

With reference to FIG. 1, one embodiment of a computer system 100 associated with executing and analyzing processes is illustrated. The computer system 100 includes an analysis module 105, which can be configured to execute on one or more computers, such as computer 515 of FIG. 5 and/or other computers. The execution and analysis of processes may be implemented within an enterprise architecture, where multiple layers are used to execute a process in a process execution environment containing components across multiple computers, such as a web application server, an enterprise backend logic server, a database server, etc. There may be different and coordinated analysis components that examine a single user's computer activities to achieve the completion of a business process.

The analysis module 105 is implement for a process execution architecture 125, such as an enterprise software platform configured to execute business processes for users. The analysis module 105 is configured to provide access to the process execution architecture 125 for executing available processes that are software programs implemented/installed on the system. Any one or more of the available processes are requestable by a plurality of users via a network interface. The available processes may comprise executable software implemented to perform one or more functions or applications, for example but not limited to, inventory tracking processes, human resource management processes, and/or other software implemented process. In one embodiment, a first user of a first client device 110, a second user of a second user device 115, and/or other users of other client devices such as an nth user of an nth client device 120 access the process execution architecture 125 over the network interface.

The first user of the first client device 110 may determine that a first process 135 available for execution by the process execution architecture 125 should be analyzed, such as due to a longer than expected runtime of the first process 135 or other issues related to the execution of the first process 135. Accordingly, the first user may specify a configuration used to defined parameters and conditions used to determine when (what triggers) and how to analyze the first process 135, which may be transmitted to the analysis module 105.

In one embodiment, the analysis module 105 receives the configuration from the first client device 110. The configuration specifies the first process 135 such as an inventory tracking process, an identifier of the first user, an analysis time to analyze the first process 135, and types of analysis tools to use for analyzing the first process 135. In one embodiment, the analysis time may specify that the first process 135 is to be analyzed by a particular analysis tool in response to a threshold number of user logins by the first user. That is, when the first user logs into the process execution architecture 125 a threshold number of times such as 6 times, then the analysis of the first process 135 is triggered. In another embodiment, the analysis time may specify that the first process 135 is to be analyzed by a particular analysis tool during an analysis timeframe such as on a particular date. Various other criteria can be used to trigger the analysis, such as the first user executing the first process 135 a threshold number of times within a timespan, which may be indicative of the first process 135 crashing and being restarted by the first user.

The configuration may be stored as configuration data 130 within a user profile of the first user, a database, a binary data structure, a text file, an extensible markup language file, etc. In one embodiment, the configuration data 130 is compressed to conserve storage space. In another embodiment, the configuration data 130 is encrypted to improve security for the first user.

In this way, the analysis module 105 can use the configuration data 130 to determine what conditions triggers the analysis of the first process 135 and what analysis tools should be used to analyze the first process 135 when certain conditions are met.

In one embodiment, the analysis module 105 may determine that the first user has accessed and logged into the process execution architecture 125. In response to the first user logging into the process execution architecture 125, the analysis module 105 evaluates the configuration data 130 to determine if analysis should be performed. In one embodiment, the configuration data 130 specifies that analysis of the first process 135 is to be performed by a particular analysis tool when the first user logs into the process execution architecture 125. It may be appreciated that the configuration data 130 may specify a variety conditions that will trigger different types of analysis for different processes, such as where a memory analysis tool is to be used for analyzing a second process when the first user has failed to successfully execute the second process more than 2 times within a 1 hour period of time.

In one embodiment, the analysis module 105 determines whether conditions specified by the configuration data 130 for triggering analysis are met, such as the first user satisfying a user identifier condition, the first process 135 satisfying a process identifier condition, and temporal/login information satisfying an analysis time condition. In one embodiment, memory and processing resource availability of the process execution architecture 125 is evaluated by the analysis module 105. If the memory and processing resource availability exceed a threshold, then the analysis module 105 may proceed with analyzing the first process 135. Otherwise, the analysis module 105 may defer analyzing the first process 135 until the memory and processing resource availability exceeds the threshold. This check may be performed so that the analysis does not hinder the ability of the process execution architecture 125 from executing processes for other clients.

In response to determining conditions are met for analyzing the first process 135 using one or more analysis tools, the analysis modulo 106 initiates an analysis session 140 within the process execution architecture 125 for executing the first process 135 for the first user. The first process 135 is executed within the analysis session 140. The one or more analysis tools can be connected to the analysis session 140 for analyzing execution of the first process 135 within the analysis session 140. The one or more analysis tools are connected to the analysis session 140 in a manner where such analysis tools do not analyze the execution of the first process 135 by the process execution architecture 125 for other users.

In one embodiment of executing the first process 135 within the analysis session 140, a determination is made that the first process 135 is to be executed within an isolated execution environment that is isolated from an execution environment provided by the process execution architecture 125 for execution of the first process and/or other processes by the other users. The determination to use the isolated execution environment may be based upon a determination that the type of analysis to be performed is disruptive and/or entails resource utilization exceeding a threshold. In one embodiment, the isolated execution environment comprises a virtual machine, such as a virtual machine hosted by a server (e.g., a distributed network server, such as a cloud server). In another embodiment, the isolated execution environment comprises a containerized environment, such as a separate Java or C# containerized runtime environment that can be analyzed by analysis tools. In another embodiment, the isolated execution environment corresponds to a separate process space, such as a separate binary process on a server that can be analyzed by analysis tools. The execution environment and/or the isolated execution environment may be comprised of one or more virtual machines, one or more containerized environments, and/or one or more separate process spaces or combinations thereof.

In this way, the first process 135 is executed through the analysis session 140 for the first user in the isolated execution environment while the first process 135 is executed for other users within the execution environment of the process execution architecture 125. A communication channel may be setup between the first client device 110 of the first user and the process execution architecture 125 for routing the first client device 110 to the isolated execution environment for executing the first process 135. The communication channel allows communication to be routed to the virtual machine, the containerized environment, the cloud server, a specialized process, or other type of isolated execution environment.

In another embodiment of executing the first process 135 within the analysis session 140, a determination is made that the first process 135 is to be executed within the execution environment provided by the process execution architecture 125 used to execute the first process 135 and/or other processes by the first user and/or the other users. The determination to use the execution environment may be based upon a determination that the type of analysis to be performed is not disruptive and entails resource utilization less than the threshold (e.g., localized and lightweight analysis is to be performed). In this way, the first process 135 is executed for the first user and/or the other users within the execution environment. However, execution of an analysis tool merely analyzes the execution of the first process 135 for the first user and does not analyze the execution of the first process 135 for the other users. Thus, analysis can be turned on to target just the first user executing the first process 135 through the analysis session 140 in the common/regular execution environment of the process execution architecture 125. A user session profile may be set to allow for the required analysis tools to be executed for the analysis of the analysis session 140 corresponding to the first process 135 being executed for the first user. The analysis tools can be disparate analysis tools that are either internally provided by the process execution architecture 125 or externally hosted by remote services and computed devices.

During execution of the first process 135 within the analysis session 140, the analysis module 105 executes one or more analysis tools for the analysis session 140 for analyzing execution of the first process 135. The one or more analysis tools may be specified through the configuration data 130 for analyzing the first process 135. Results 145 of the analysis may be stored within a data structure, provide through a user interface, providing through an email or other message, provided for real-time interaction such as live debugging during execution of the first process 135, etc. Various types of analysis tools may be executed. In one embodiment, the analysis tool is executed as a wrapper around code of the first process 135 for detecting memory leaks, memory overwrites, and/or other memory issues. In another embodiment, the analysis tool is executed as a wrapper around code of the first process 135 for call graph analysis to determine amounts of execution time spent in portions of code of the first process 135. In another embodiment, the analysis tool is executed to analyze a server subsystem of the process execution architecture 125 used to host the first process 135. In another embodiment, the analysis tool is executed to enable logging of process execution data into a log data structure. It may be appreciated that a variety of other types of analysis may be performed, such as analysis from multiple disparate analysis tools locally or remotely hosted with respect to the process execution architecture 125. The analysis module 105 is able to isolate the first user and the first process 135 at a particular layer, multiple layers, or all layers of the process execution architecture 125 for execution of the analysis so that the analysis tools do not analyze execution of the first process 135 and/or other processes by other users.

The results 145 of the analysis may be sent through a notification summary made accessible through a web application accessible to a web browser or application, stored to disk, etc. The results 145 may be created and/or provided based upon various triggers, such as the first user logging out. The results 145 may comprise real-time analysis of the first process 135 during execution of the first process 135 or may provide summary data after completion of the execution of the first process 135.

Figure 2:
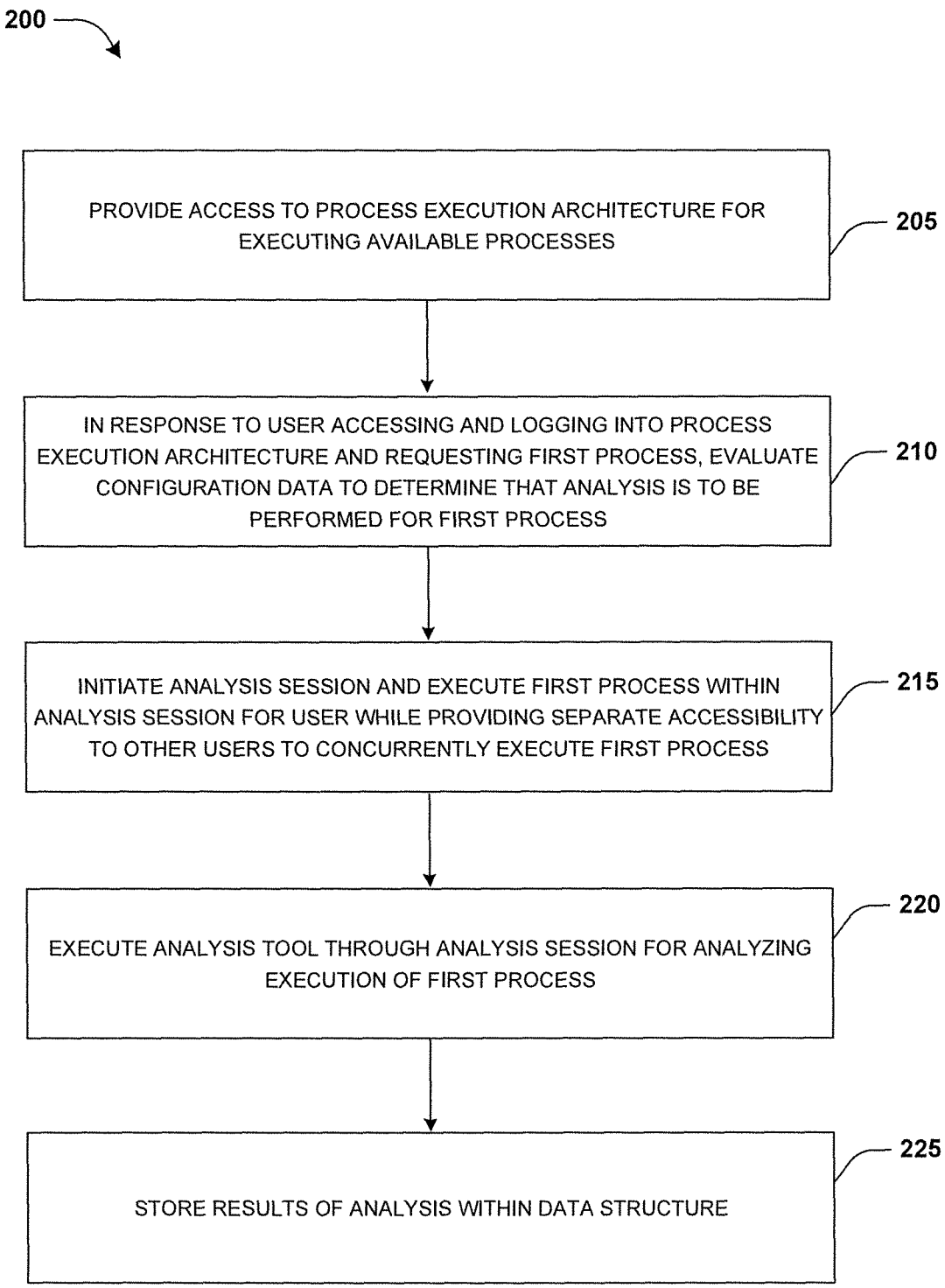
FIG. 2 illustrates an embodiment of a method associated with executing and analyzing processes.

With reference to FIG. 2, one embodiment of a computer implemented method 200 associated with executing and analyzing processes is illustrated. In one embodiment, the method 200 is performed by the analysis module 105 utilizing various computing resources of the computer 515 and/or other computers, such as the processor 520 for executing instructions associated with initiating the analysis session 140, executing an analysis tool, etc. Memory 535 and/or disks 555 are used for storing results 145 of the analysis and/or other data. Network hardware is used for communicating data structures and/or other data between the computer 515 and remote computers over a network. The method 200 is triggered upon a determination that a user and a process is to be analyzed.

Figure 3A:
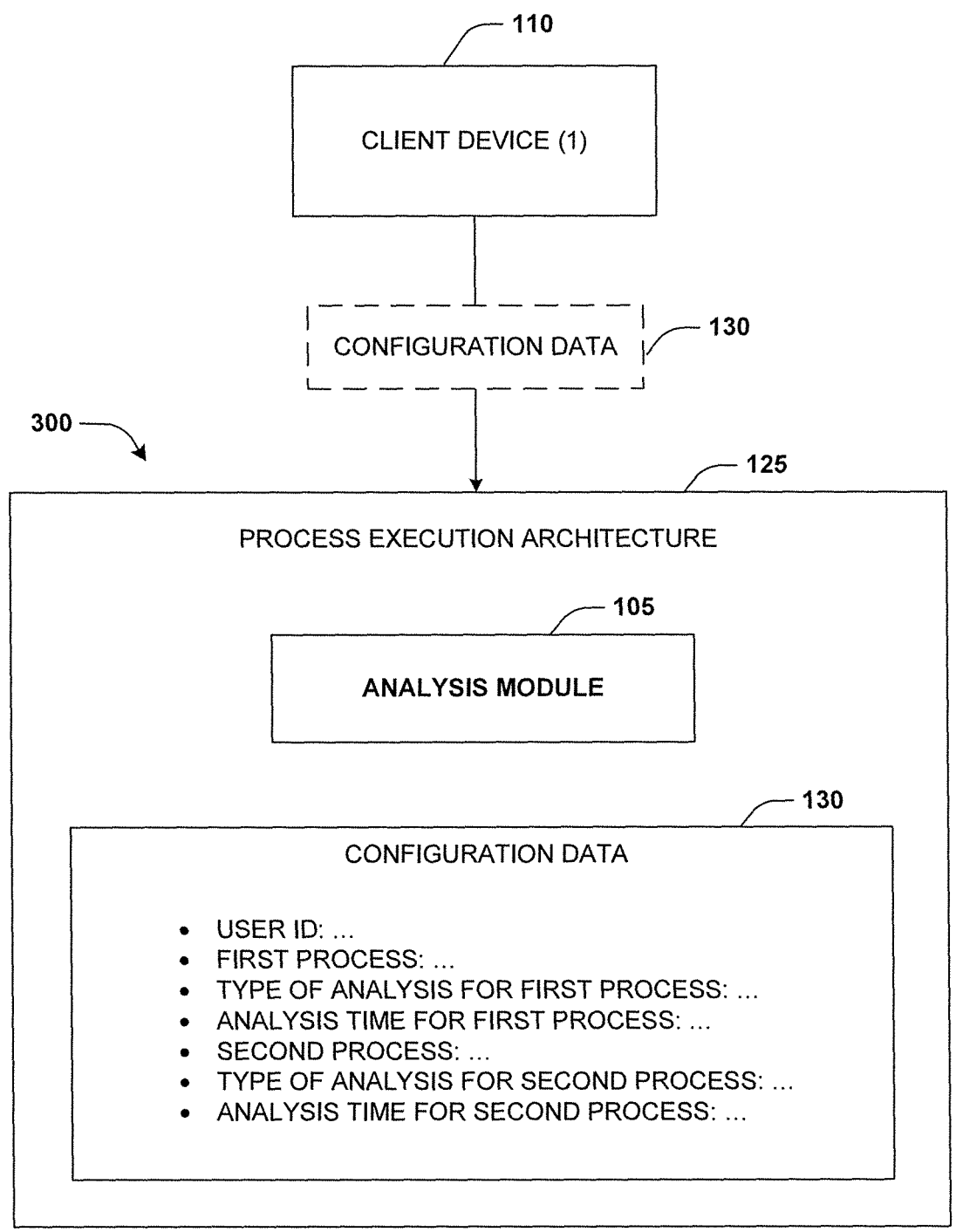
FIG. 3A illustrates an embodiment of a system associated with executing and analyzing processes, where a first process is executed within an execution environment.
Figure 3B:
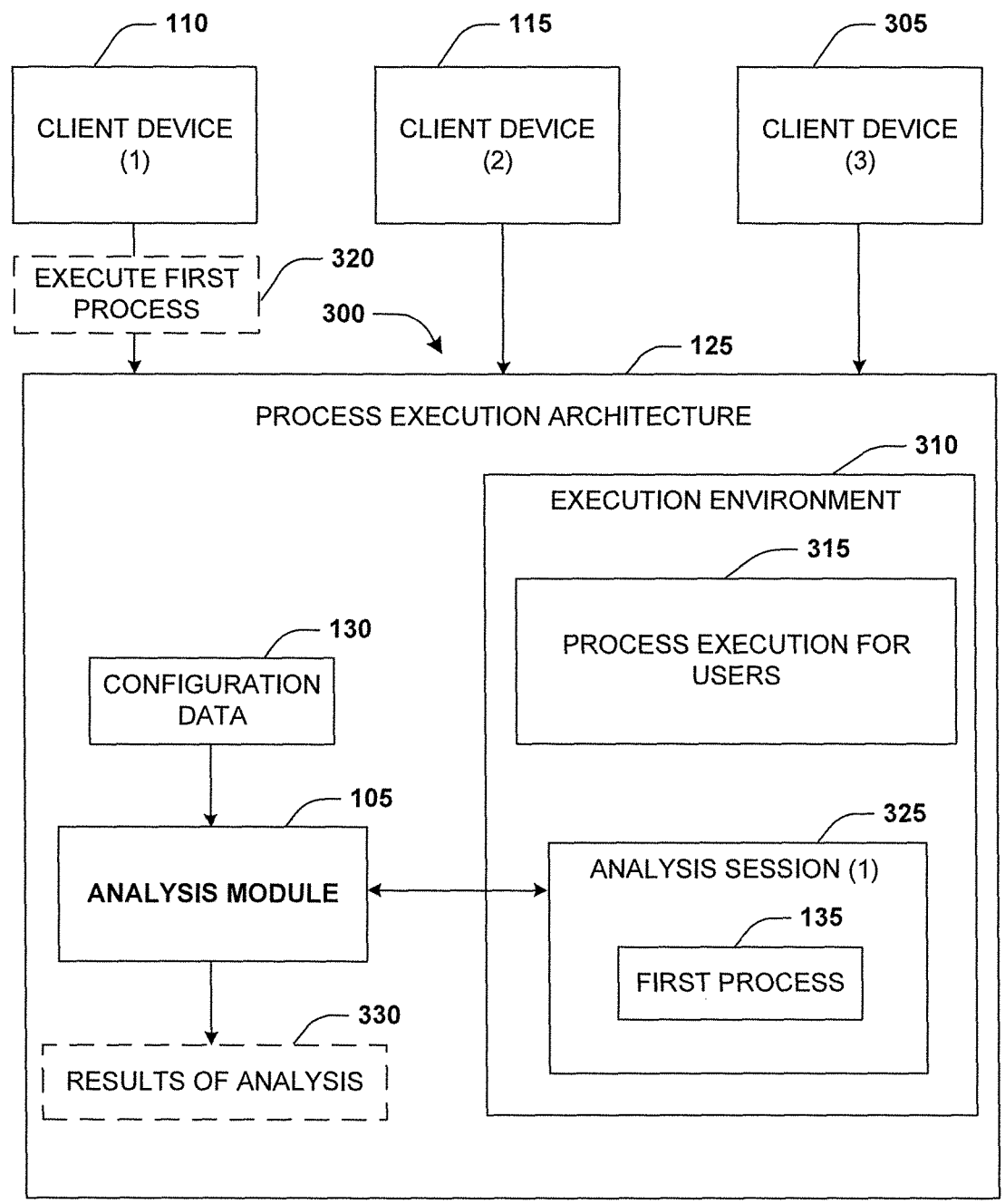
FIG. 3B illustrates an embodiment of a system associated with executing and analyzing processes, where a first process is executed within an execution environment.
Figure 3C:
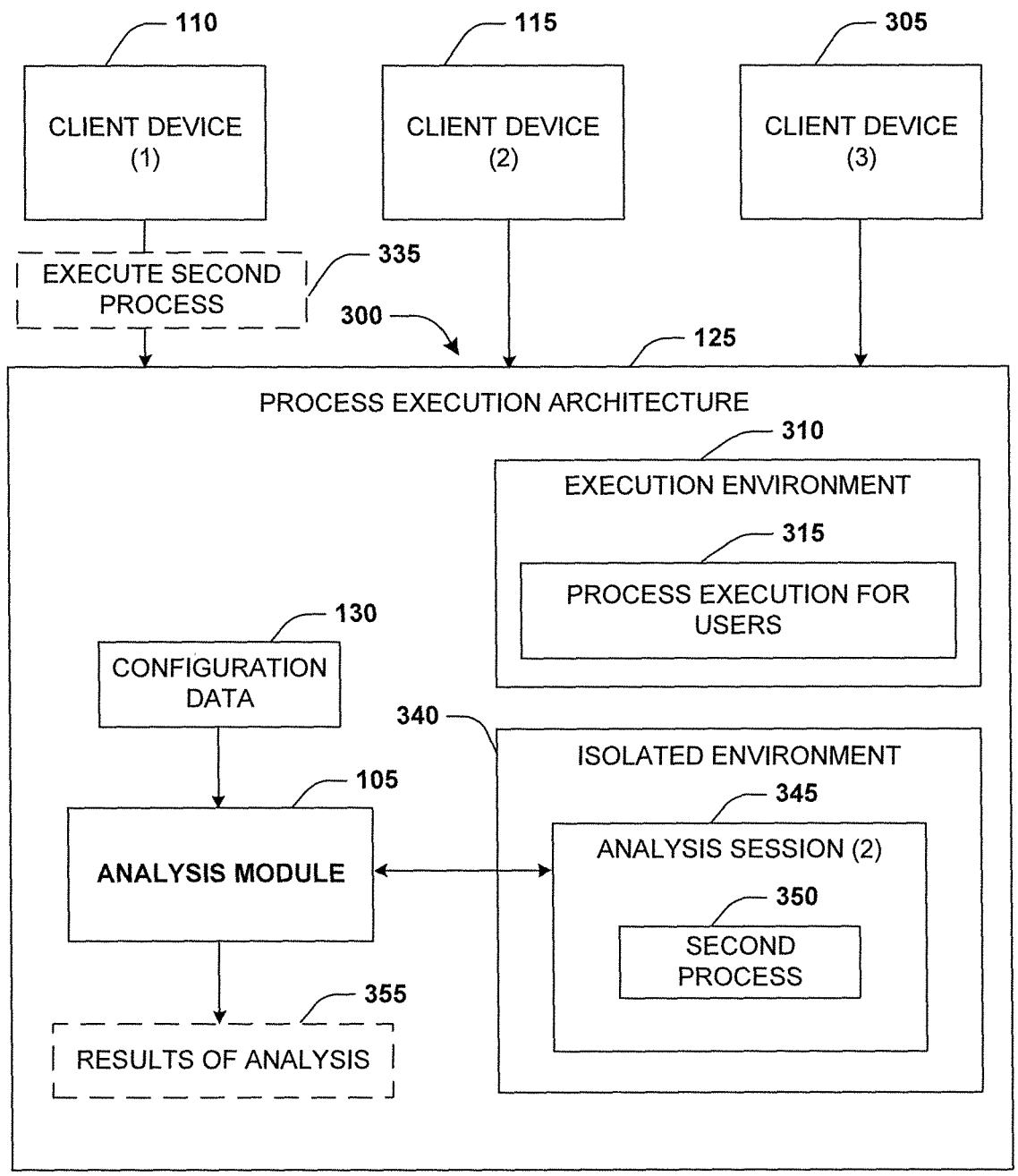
FIG. 3C illustrates an embodiment of a system associated with executing and anazlying processes, where a second process is executed in an isolated environment.

At 205, access to the process execution architecture 125 is provided to client devices such as the first client device 110, the second client device 155, and the third client device 305 for executing available processes that are requested by a plurality of users via a network interface, as illustrated by example system 300 of FIGS. 3A-3C. The analysis module 105 may receive configuration data 130 from the first client device 110, as illustrated by example 300 of FIG. 3A. The configuration data 130 may specify a user identifier of the first user of the first client device 110. The configuration data 130 may specify a process identifier of the first process 135 that is to be analyzed. The configuration data 130 may specify types of analysis to perform upon the first process 135, such as different types of analysis to perform when different conditions/criteria are met. The configuration data 130 may specify when the analysis is to be triggered or performed. The configuration data 130 may specify other information about analyzing the first process 135 such as criteria to trigger the analysis (e.g., a number of logins, a certain date/time, resource availability, etc.). The configuration data 130 may specify a second process 350 that is to be analyzed, types of analysis to perform upon the second process 350, when the analysis is to be triggered or performed, and/or other information about analyzing the second process 350 such as criteria to trigger the analysis. In this way, the analysis module 105 stores the configuration data 130, such as within a database, a text file, a binary data structure, an extensible markup language file, a user profile of the first user, etc. The analysis module 105 may encrypt and/or compress the configuration data 130.

At 210, the analysis module 105 may determine that analysis is to be performed, as illustrated by example 300 of FIG. 3B. The analysis module 105 may evaluate the configuration data 130 to determine that analysis is to be performed upon the first process 135 based upon the first user accessing and logging into the process execution architecture 125 and requesting 320 execution of the first process 135.

The configuration data 130 may specify that call graph analysis is to be performed when the first user logs into the process execution architecture 125 and requests 320 execution of the first process 135. In one embodiment, the configuration data 130 may indicate that the first process 135 can be executed within an execution environment 310 of the process execution architecture 125 for call graph analysis. In another embodiment, a determination is made that resource utilization, overhead, and/or disruption to other executing processes for other users is below a threshold, and thus the first process 135 can be executed within the execution environment 310 as opposed to an isolated environment 340. The execution environment 310 is used by the process execution architecture 125 as a common execution space to execute 315 processes for the plurality of users, such as execution of the first process 135 for the third user of the third client device 305, execution of a second process 350 for the second user of the second client device 115, etc. Thus, the determination is made that performing call graph analysis upon execution of the first process 315 within the execution environment 310 will have low impact on the ability of the process execution architecture 125 to execute 315 processes through the execution environment 310 for other users.

At 215, the analysis module 105 may initiate an analysis session 325. The analysis session 325 may correspond to a user session with the process execution architecture 125 (e.g., a user execution space within which processes such as the first process 135 can be executed for the first user by the process execution architecture 125). The first process 135 can be executed through the analysis session 325 for the first user while separate accessibility is provided by the process execution architecture 125 to other users for executing the first process 135 and/or other processes through the execution environment 310.

At 220, one or more analysis tools such as a call graph analysis tool are executed for the analysis session 325 for analyzing execution of the first process 135 within the analysis session 325. The call graph analysis tool may be turned on for the execution of the first process 135 for the first user but not for the execution of the first process 135 and/or other processes for other users. In one embodiment, execution of the call graph analysis tool may allow for real-time interaction with the call graph analysis tool and/or other analysis tools during execution of the first process 135. In another embodiment, the call graph analysis tool may provide an analysis summary such as through an email, a user interface, etc. In this way, results 330 of the analysis are provided, at 225.

FIG. 3C illustrates the first user accessing the process execution architecture 125 using the first client device 110. The first user may request 335 execution of the second process 350. The analysis module 105 may evaluate the configuration data 130 to determine that criteria are met for analyzing the second process 350. The configuration data 130 may specify that analysis is to be performed if the first user has restarted execution of the second process 350 a threshold number of times within a threshold timespan, which may be indicative of the second process 350 crashing on the first user and the first user restarting the second process 350 multiple times. Thus, it may be advantageous to perform analysis on the second process 350. It may be appreciated that a variety of criteria/conditions can be used to determine when to analyze a process, such as after a certain number of times a process has been executed, a certain number of times the process has been executed within a certain timespan such as during a single day, a certain number of logins by a user, on a particular date, receipt of a command, identification of an issue or problem such as where the second process 350 has crashed a certain number of times of the first user, etc.

The configuration data 130 may specify the type of analysis to be performed when the first user requests 335 execution of the second process 350, such as memory analysis and debugger analysis. In one embodiment, if certain criteria/conditions are met, then corresponding types of analysis are performed. The analysis module 105 may determine that resource utilization, overhead, and disruption to other users may exceed a threshold when analyzing the process using memory analysis and debugger analysis, and thus the second process 350 should be executed for analysis through the isolated environment 340 that is isolated from the execution environment 310. In one embodiment, the configuration data 130 may specify which types of analysis can use the execution environment 310 and which types of analysis are to use the isolated environment 340.

The analysis module 105 initiates a second analysis session 345 within the isolated environment 340 for executing and analyzing the second process 350 using a memory analysis tool and a debugger analysis tool. The isolated environment 340 may comprise a virtual machine, a separate server such as a virtual machine executing in a cloud server separate from servers executing the execution environment 310, a containerized environment for executing code separate from the execution of code within the execution environment 310, etc. Thus, the second process 350 is executed through the second analysis session 345 within the isolated environment 340 separate from execution 315 of processes such as the second process 350 and/or other process through the execution environment 310 for other users by the process execution architecture 125.

The first user is routed to the isolated environment 340 for execution of the second process 350. In one embodiment, communication channels are setup between the first client device 110 and the isolated environment 340 for the routing of instructions and data to and from the isolated container runtime, virtual machine, cloud server, or specialized process of the isolated environment 340. The memory analysis tool is connected to the isolated environment 340 and executed to perform memory analysis on the second process 350. The debugger analysis tool is connected to the isolated environment 340 and executed to perform interactive real-time debugging on the second process 350. In one embodiment, user access may be provided to the analysis tools such as the debugger analysis tool for interaction with the debugger analysis tool during execution and analysis of the second process 350. In another embodiment, results 355 of the analysis may be stored and/or provided to the first user and/or other users.

Figure 4:
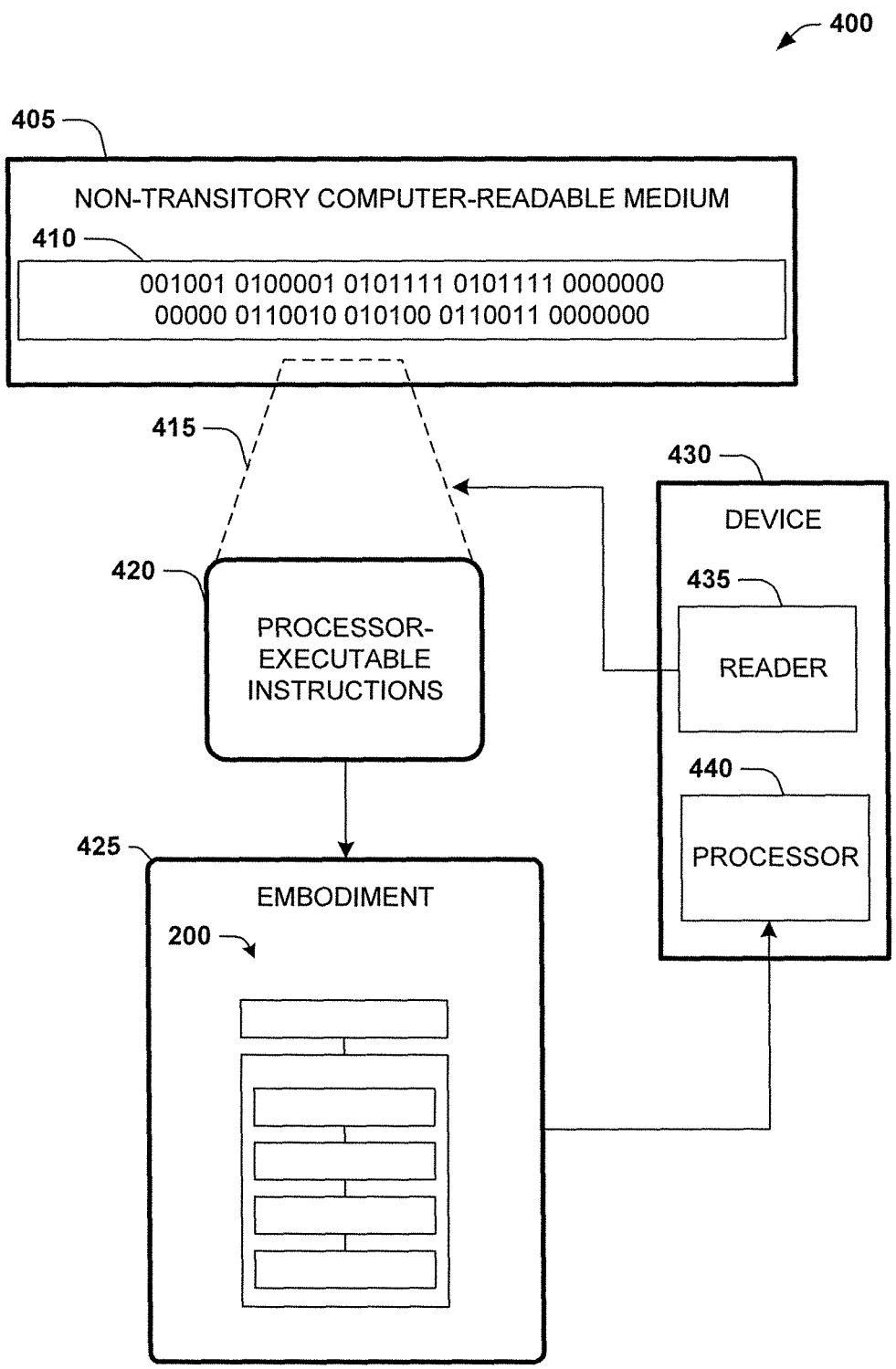
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the analysis module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the analysis module 105, stored in the non-transitory computer-readable medium 405, may be executed by the processor 440 as the processor-executable instructions 420 to perform an embodiment 425 of the method 200 of FIG. 2.

The non-transitory computer-readable medium 406 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
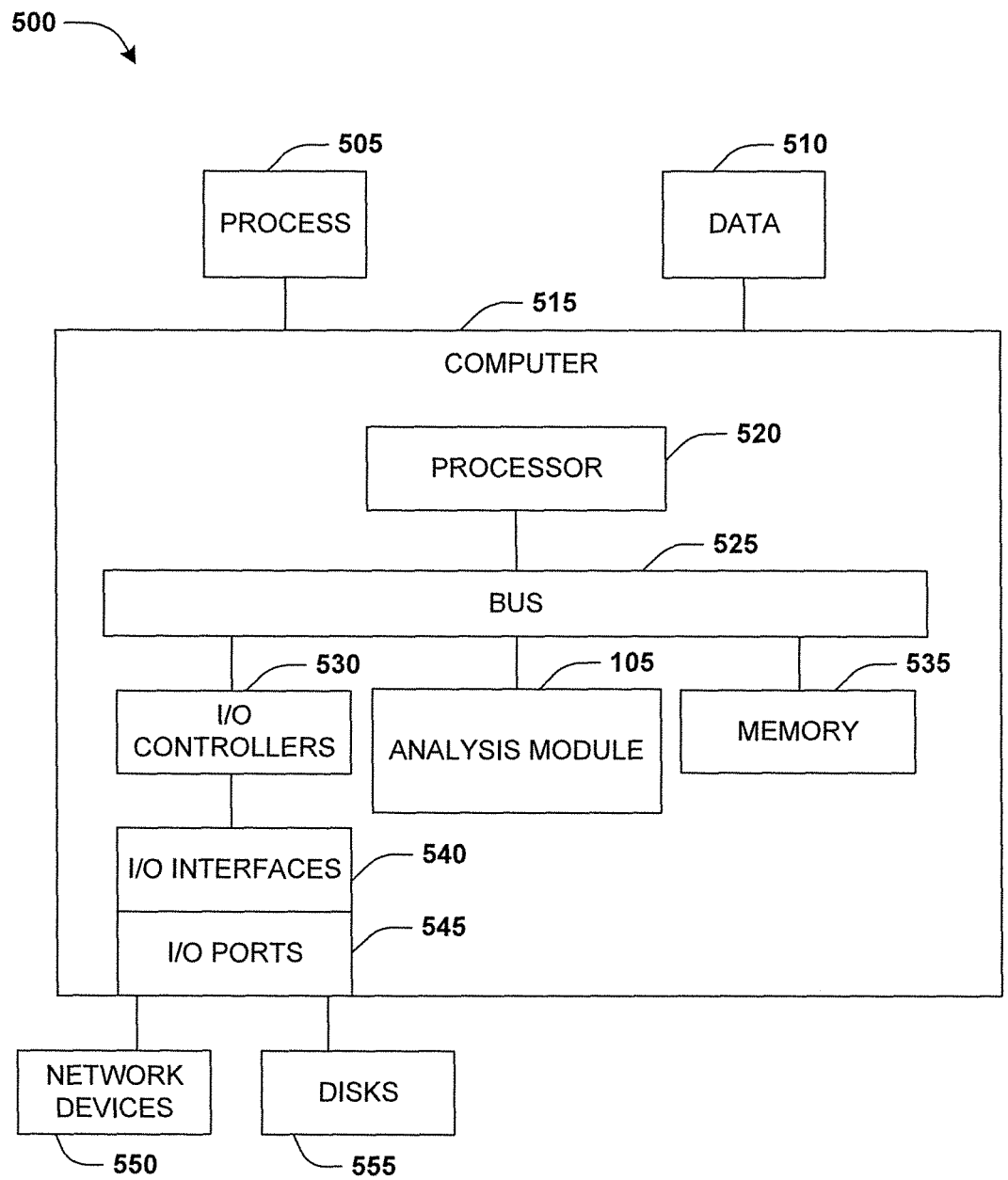
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the analysis module 105 configured to facilitate the system 100 and/or the method 200 shown in FIGS. 1-2. In different embodiments, the logic of the analysis module 105 may be implemented in hardware, a non-transitory computer-readable medium 505 with stored instructions, firmware, and/or combinations thereof. While the logic of the analysis module 105 is illustrated as a hardware component attached to the bus 525, it is to be appreciated that in other embodiments, the logic of the analysis module 105 could be implemented in the processor 520, stored in memory 535, or stored in disk 555.

In one embodiment, logic of the analysis module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the analysis module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
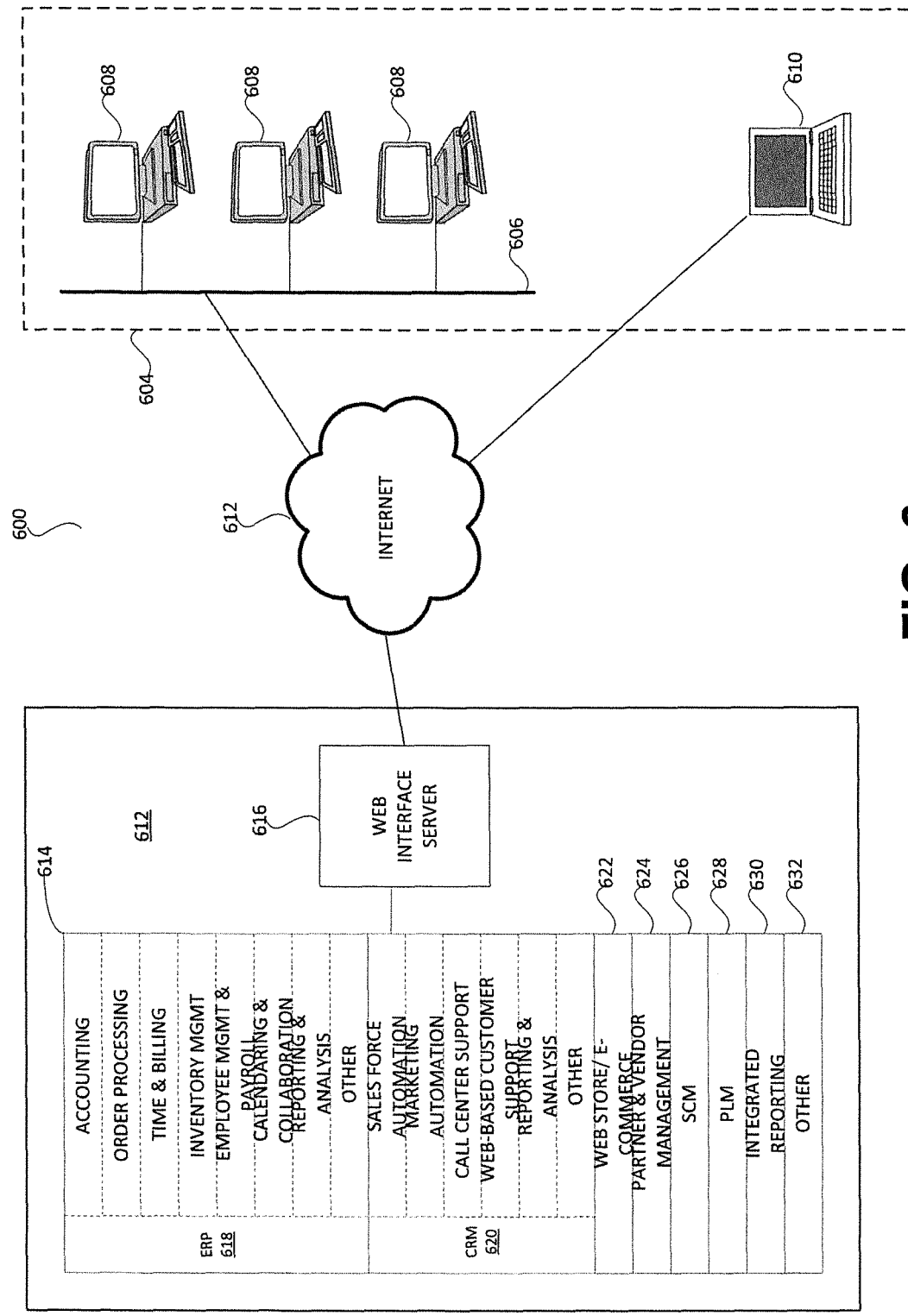
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface-server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 620 may include, but is not limited to, a sales force automation (SFA) module, a marketing automation module, a contact list module (not shown), a call center support module, a web-based customer support module, a reporting and analysis module, and other CRM-related modules. The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
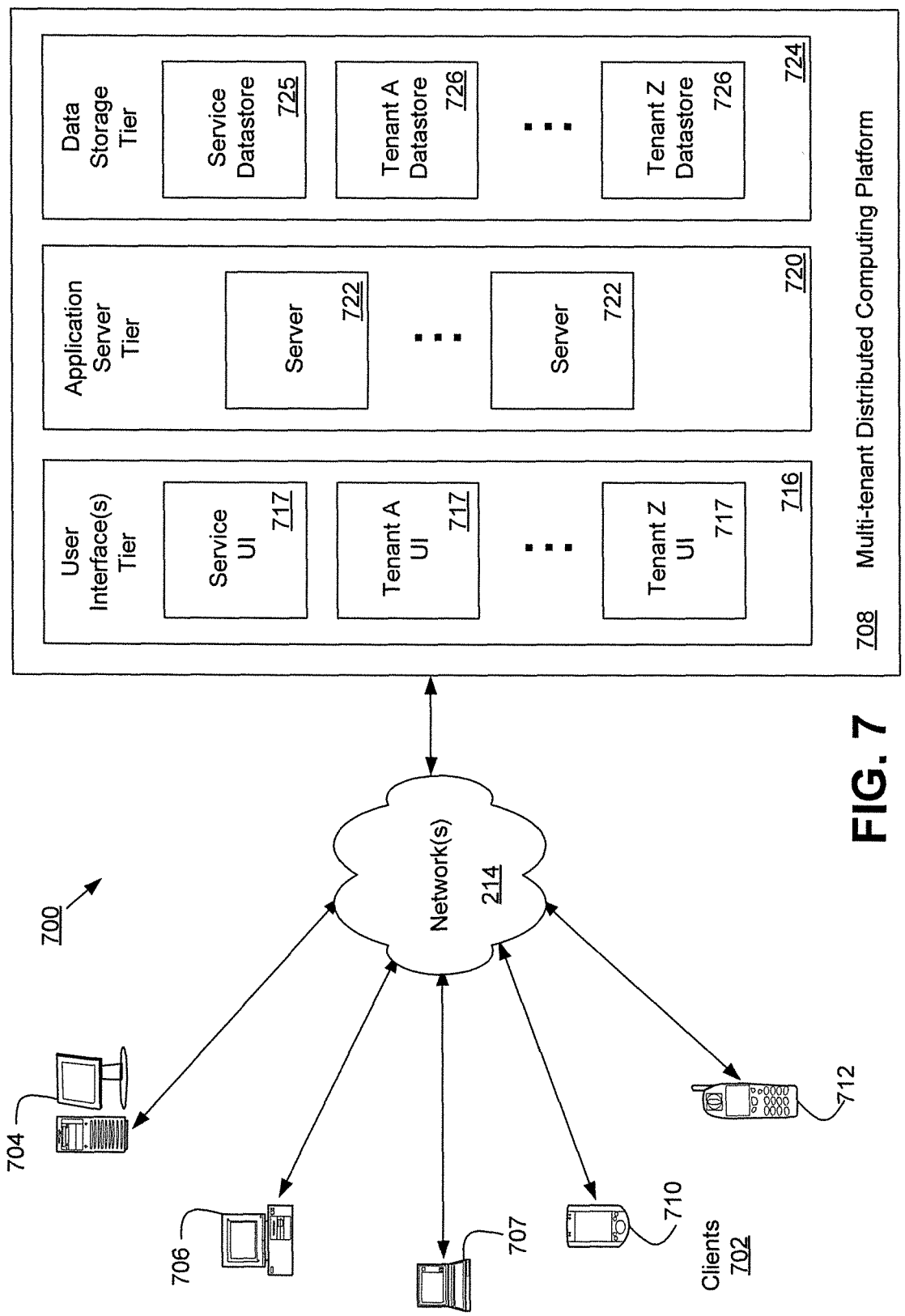
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices. Examples of suitable computing devices include personal computers, server computers 704, desktop computers 706, laptop computers 707, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 717, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be Inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least one processor of a computing system causes the processor to:
provide, via at least one network interface, access to a process execution architecture for executing available processes that are requestable by a plurality of users via the at least one network interface;
in response to a user accessing and logging into the process execution architecture and requesting a first process from the available processes, evaluate configuration data associated with the user to determine that an analysis is to be performed upon the first process;
in response to determining that the analysis is to be performed on the first process, create an isolated execution environment for executing the first process in the process execution architecture;
wherein the isolated execution environment is isolated from other execution environments provided by the process execution architecture for execution of other instances of the first process;
setup a communication channel between a computing device of the user and the process execution architecture for routing communications between the computing device and the isolated execution environment;
initiate an analysis session in the isolated execution environment and execute the first process within the analysis session for the user within the isolated execution environment while providing separate accessibility to other users to concurrently execute the other instances of the first process within the execution environment through the process execution architecture;
execute an analysis tool through the analysis session for analyzing execution of the first process, wherein the analysis tool is specified by the configuration data; and
store results of the analysis tool within a data structure.

2. The non-transitory computer-readable medium of claim 1, wherein the analysis tool includes a debugger for debugging the first process during execution.

3. The non-transitory computer-readable medium of claim 1, wherein the isolated execution environment is a virtual machine hosted by a cloud server.

4. The non-transitory computer-readable medium of claim 1, wherein the isolated execution environment is a containerized environment.

5. The non-transitory computer-readable medium of claim 1, wherein the instructions cause the processor to:
execute the analysis tool for analysis of execution of the first process for the user, wherein the analysis tool does not analyze execution of the other instances of the first process by other users.

6. The non-transitory computer-readable medium of claim 1, wherein the instructions cause the processor to:
evaluate the configuration data to determine an analysis time specifying at least one of an analysis timeframe for performing the analysis or a number of user logins for performing the analysis; and
execute the analysis tool according to the analysis time.

7. The non-transitory computer-readable medium of claim 1, wherein the instructions cause the processor to:
evaluate memory and processing resource availability of the process execution architecture; and
execute the analysis tool if the memory and processing resource availability exceeds a threshold.

8. A computing system, comprising:
at least one processor connected to at least one memory; and
an analysis module stored on a non-transitory computer readable medium and configured with instructions that when executed by the at least one processor cause the at least one processor to:
provide, via at least one network interface, access to a process execution architecture for executing available processes that are requestable by a plurality of users via the at least one network interface;
in response to a user accessing and logging into the process execution architecture and requesting a first process from the available processes, evaluate configuration data associated with the user to determine that an analysis is to be performed upon the first process;
in response to determining that the analysis is to be performed on the first process, create an isolated execution environment isolated from an execution environment provided by the process execution architecture for execution of other instances of the first process by other users;
setup a communication channel between a computing device of the user and the process execution architecture for routing communications between the computing device and the isolated execution environment for executing the first process;
initiate an analysis session in the isolated execution environment and execute the first process within the analysis session for the user within the isolated execution environment while providing separate accessibility to other users to concurrently execute the other instances of the first process within the execution environment through the process execution architecture;
execute an analysis tool through the analysis session for analyzing execution of the first process, wherein the analysis tool is specified by the configuration data; and
store results of the analysis tool within a data structure.

9. The computing system of claim 8, wherein the instructions comprise instructions that cause the processor to:
in response to determining that the user has logged out, send a notification summary of the results over a network to a remote computing device.

10. The computing system of claim 8, wherein the instructions comprise instructions that cause the processor to:
provide a remote computing device with access to the results within the data structure through a web application accessible through at least one of a web browser or application of the remote computing device.

11. The computing system of claim 8, wherein the instructions comprise instructions that cause the processor to:
execute the analysis tool to enable logging of process execution data into a log data structure.

12. The computing system of claim 8, wherein the instructions comprise instructions that cause the processor to:
execute the analysis tool as a wrapper around code of the first process for detecting at least one of memory leaks or memory overwrites.

13. The computing system of claim 8, wherein the instructions comprise instructions that cause the processor to:
execute the analysis tool as a wrapper around code of the first process for call graph analysis to determine amounts of execution time spent in portions of the code.

14. The computing system of claim 8, wherein the instructions comprise instructions that cause the processor to:
execute the analysis tool to analyze a server subsystem of the process execution architecture used to host the first process.

15. A computer-implemented method, the computer-implemented method involving a computing device comprising a processor coupled with memory-stored instructions which, when executed by the processor cause the processor to perform the method, comprising:
providing, via at least one network interface, access to a process execution architecture for executing available processes that are requestable by a plurality of users via the at least one network interface;
in response to a user accessing and logging into the process execution architecture and requesting a first process from the available processes, evaluating configuration data associated with the user to determine that an analysis is to be performed upon the first process;
in response to determining that the analysis is to be performed on the first process, creating an isolated execution environment for executing the first process in the process execution architecture;
wherein the isolated execution environment is isolated from other execution environments provided by the process execution architecture for execution of other instances of the first process;
setting up a communication channel between a computing device of the user and the process execution architecture for routing communications between the computing device and the isolated execution environment;
initiating an analysis session in the isolated execution environment and execute the first process within the analysis session for the user within the isolated execution environment while providing separate accessibility to other users to concurrently execute the other instances of the first process within the execution environment through the process execution architecture;
executing an analysis tool through the analysis session for analyzing execution of the first process, wherein the analysis tool is specified by the configuration data; and
storing results of the analysis tool within a data structure.

16. The computer-implemented method of claim 15, further comprising:
receiving a configuration specifying the first process, the user, an analysis time, and a type of analysis tool to use for analyzing the first process; and
storing the configuration as the configuration data within a user profile of the user.

17. The computer-implemented method of claim 15, further comprising:
receiving a configuration specifying the first process, the user, an analysis time, and a type of analysis tool to use for analyzing the first process; and
storing the configuration as the configuration data within at least one of a database, a binary data structure, a text file, or an extensible markup language file.

18. The computer-implemented method of claim 15, further comprising:
encrypting the configuration data.

19. The computer-implemented method of claim 15, further comprising:
compressing the configuration data.

* * * * *